(12) United States Patent
Lynch et al.

(10) Patent No.: US 9,736,682 B2
(45) Date of Patent: Aug. 15, 2017

(54) ADDRESSING WIRELESS NODES

(71) Applicant: INTERDIGITAL PATENT HOLDINGS, INC., Wilmington, DE (US)

(72) Inventors: Kenneth F. Lynch, Wayne, PA (US); Robert A. DiFazio, Greenlawn, NY (US)

(73) Assignee: InterDigital Patent Holdings, Inc., Wilmington, DE (US)

(*) Notice: Subject to any disclaimer, the term of this patent is extended or adjusted under 35 U.S.C. 154(b) by 0 days.

(21) Appl. No.: 14/096,842

(22) Filed: Dec. 4, 2013

(65) Prior Publication Data

US 2014/0086150 A1   Mar. 27, 2014

Related U.S. Application Data

(63) Continuation of application No. 13/099,857, filed on May 3, 2011, now Pat. No. 8,655,344.

(60) Provisional application No. 61/330,771, filed on May 3, 2010.

(51) Int. Cl.
| | |
|---|---|
| *H04M 3/00* | (2006.01) |
| *H04W 8/26* | (2009.01) |
| *H04L 29/08* | (2006.01) |
| *H04W 4/02* | (2009.01) |
| *H04W 4/04* | (2009.01) |

(52) U.S. Cl.
CPC ............ *H04W 8/26* (2013.01); *H04L 67/125* (2013.01); *H04L 67/16* (2013.01); *H04W 4/026* (2013.01); *H04W 4/043* (2013.01)

(58) Field of Classification Search
None
See application file for complete search history.

(56) References Cited

U.S. PATENT DOCUMENTS

| | | | |
|---|---|---|---|
| 2003/0033389 A1* | 2/2003 | Simpson | 709/220 |
| 2007/0006098 A1* | 1/2007 | Krumm et al. | 715/825 |
| 2007/0050054 A1* | 3/2007 | Sambandam Guruparan | G08C 19/28 700/65 |
| 2007/0130399 A1* | 6/2007 | Anderson et al. | 710/62 |
| 2007/0197229 A1* | 8/2007 | Kalliola et al. | 455/456.1 |
| 2007/0224938 A1* | 9/2007 | Jung et al. | 455/41.2 |
| 2008/0311957 A1* | 12/2008 | Jantunen et al. | 455/560 |
| 2009/0054077 A1 | 2/2009 | Gauthier et al. | |
| 2011/0237254 A1 | 9/2011 | Lee | |

* cited by examiner

*Primary Examiner* — Suhail Khan
(74) *Attorney, Agent, or Firm* — Condo Roccia Koptiw LLP

(57) ABSTRACT

A user may point a control device at a controllable device for which control is desired, and the control device may detect the targeted controllable device. Additionally, the control device may detect a plurality of wireless nodes and list the available wireless nodes. For example, the control device may identify wireless nodes associated with a particular room in the house, or the control device may detect the wireless nodes within a certain range. The list may be a selectable list and a user may select the desired device to control from the list. Upon detection or user selection, the control device may establish control of the wireless node and initiate actions associated with the selected device.

22 Claims, 11 Drawing Sheets

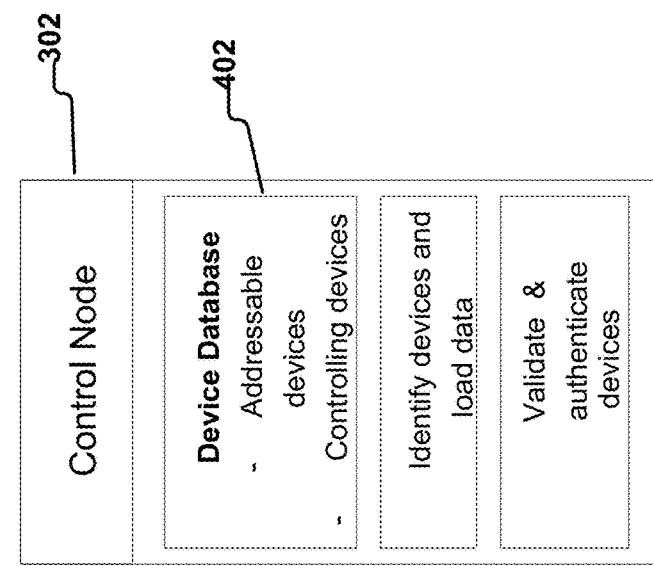
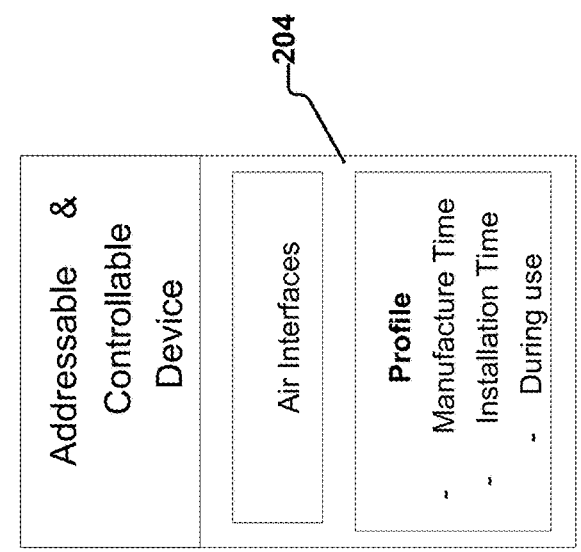
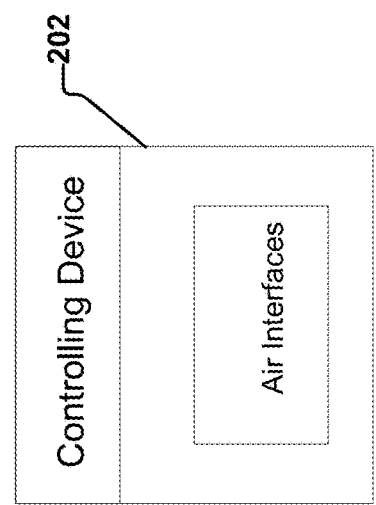
Figure 4A
Figure 4B
Figure 4C ered. A priority value may be assigned to each addressable device in the list of addressable devices. For example, a priority value may be assigned to each addressable device by analyzing the relation between the location of the address-
ADDRESSING WIRELESS NODES

CROSS REFERENCE TO RELATED APPLICATION

This application is a continuation of U.S. patent application Ser. No. 13/099,857, which was filed on May 3, 2011; which claims the benefit of U.S. provisional application 61/330,771, which was filed on May 3, 2010, the contents of which is hereby incorporated by reference herein.

BACKGROUND

As wireless nodes proliferate in all areas of life, a simple and practical means to address and control the wireless nodes is lacking. For instance, a room, such as a living room, may contain multiple electronic devices that are capable of communicating wirelessly. Current methods for addressing and controlling wireless nodes may not be practical or efficient for wider deployment. For example, separate remote controls may be impracticable for a large number of wireless nodes. User-programmed universal remotes may reduce the number of devices, but the setup and/or technical expertise required is likely to remain as a barrier for many users. Thus, current methods are limiting when it comes to a wider deployment of addressing and controlling wireless nodes.

SUMMARY

Disclosed herein are techniques for addressing and controlling wireless nodes. The techniques may be used to address and control a single wireless node but are also designed for use with a multitude of wireless nodes. For example, the techniques may detect and differentiate between a plurality of controllable devices. Upon detection or receipt of an indication of the device for which to control, the control device may establish a connection to the controllable device and may control certain aspects of the controllable device.

In an embodiment, a user may point a control device at a controllable device for which control is desired, and the control device may detect the targeted controllable device. In another embodiment, the control device may detect a plurality of wireless nodes and list the available wireless nodes. For example, the control device may identify wireless nodes associated with a particular room in the house, or the control device may detect the wireless nodes within a certain range. The list may be a selectable list and a user may select the desired device to control from the list. Upon detection or user selection, the control device may establish control of the wireless node and initiate actions associated with the selected device.

In another embodiment, a method is disclosed for selecting an addressable device to be controlled by a wireless transmit/receive unit (WTRU). An indication that at least one or more devices are within range of the WTRU may be received. A list of addressable devices may be generated. The list of addressable devices may indicate devices that may be wirelessly controlled. A location of each addressable device may be determined in relation to the WTRU. The direction in which the WTRU is pointing may be determined. A priority value may be assigned to each addressable device in the list of addressable devices. For example, a priority value may be assigned to each addressable device by analyzing the relation between the location of the addressable device and the direction in which the WTRU is pointing. The list of addressable devices may be provided to a user.

In another embodiment, a method is disclosed for selecting an addressable device to be controlled by a WTRU. A list of addressable devices may be generated. The list of addressable devices may indicate devices within range of the WTRU which may be wirelessly controlled. A location of the WTRU may be determined. A usage context may be determined by analyzing the location of the WTRU and the list of the addressable devices. For example, it may be determined that a user is sitting in front of a television in a living room and wishes to control the television. A priority value may be assigned to each addressable device according to the usage context. A connection may be established between the WTRU and the addressable device, such that the addressable device may be controlled by the WTRU.

In another embodiment, a WTRU is disclosed to select and control an addressable device. The WTRU may comprise:
  a transceiver that may be configured to receive an indication that at least one or more devices are within range of the WTRU;
  a processor that may be configured to:
    generate a list of addressable devices from, the list of addressable devices indicating devices within the at least one or more devices that may be wirelessly controlled;
    assign a priority value to each addressable device in the list of addressable devices;
    determine the location of each addressable device in relation to the WTRU;
    determine the direction in which the WTRU is pointing; and
    assign a priority value to each addressable device by analyzing the relation between the location of the addressable device and the direction in which the WTRU is pointing.
  a display, the display configured to provide the list of addressable devices to a user.

Also disclosed herein are techniques for collecting status information from devices via the wireless nodes. For example, a control device pointed at a wireless node may collect information from the wireless node, or the control device may received updates from devices within a certain range.

BRIEF DESCRIPTION OF THE DRAWINGS

FIGS. 4A-4C illustrate an example control device, controllable device, and control node.

DETAILED DESCRIPTION OF ILLUSTRATIVE EMBODIMENTS

Figure 1A:
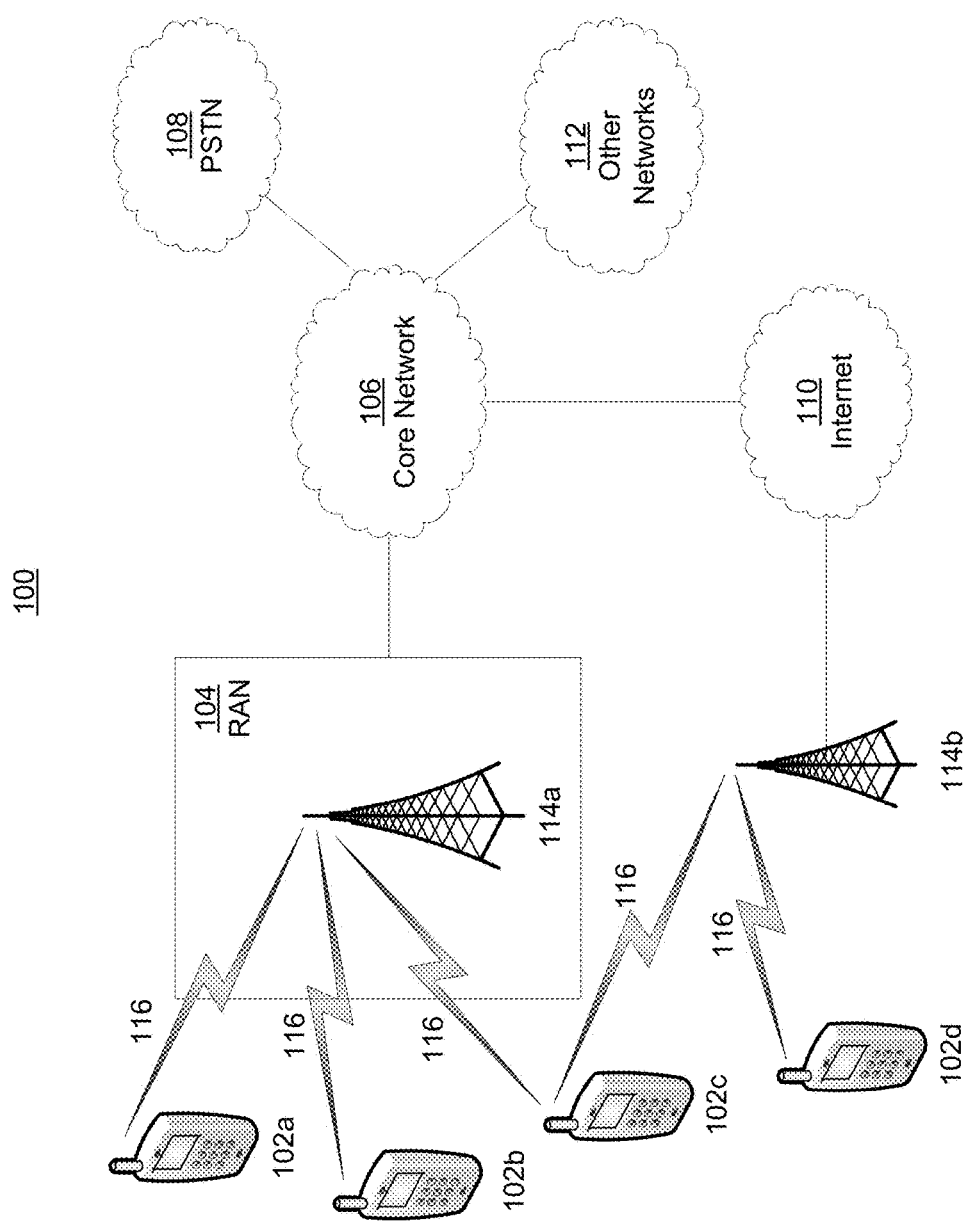
FIG. 1A is a system diagram of an example communications system in which one or more disclosed embodiments may be implemented.

Disclosed herein are techniques for addressing and controlling wireless nodes. The techniques may be used to address and control a single wireless node but are also designed for use with a multitude of wireless nodes. For example, the techniques may detect and differentiate between a plurality of controllable devices. Upon detection or receipt of an indication of the device for which to control, the control device may establish a connection to the controllable device and may control certain aspects of the controllable device.

In one example embodiment, a wireless transmit/receive unit (WTRU) may be used to select an addressable device that may be controlled by the WTRU. To enable the WTRU to select and control the addressable device, an indication may be received that may indicate that at least one or more devices may be within range of the WTRU. For example, the WTRU may be equipped with a directional antenna that may detect electronic devices, such as TVs, DVD players, or the like, that may be within range of the WTRU.

A list of addressable devices may then be generated by the WTRU. The list of addressable devices may indicate devices that may be wirelessly controlled. For example, the WTRU may detect a TV, DVD player, and a refrigerator within a room that may be wireless enabled. The WTRU may also detect that the TV and DVD player may be wirelessly controlled. In generating a list of addressable devices, the WTRU will include the TV and DVD player, but not the refrigerator, as the TV and DVD player may be wirelessly controlled.

Using the list of addressable devices, the WTRU may assign a priority value to each of the addressable devices within the list. The priority value may indicate which addressable device a user may most likely wish to control. For example, the priority value may indicate that the user may wish to control a television over a DVD player or a refrigerator.

Priority values may also be assigned to each of the addressable devices within the list by determining a signal quality for each addressable device within the list of addressable devices. The signal quality may be a received signal strength indicator, a signal to noise ratio, or the like. For example, an addressable device with a high signal to noise ratio may receive higher priority than an addressable device with a low signal to noise ratio.

Priority values may also be assigned according to how close an addressable device is in distance to the WTRU. For example, addressable devices that are closer to the WTRU may be given higher priority values than addressable devices that are from the WTRU. To assign priority values, the distance between each addressable device and the WTRU may be determined. Each addressable device may then be assigned a priority value according to how close the addressable device is in distance to the WTRU. This addressable device list may then be sorted according to the priority values such that the addressable devices that are closest to the WTRU would be presented to a user before the addressable devices that are furthest from the WTRU.

Priority values may also be assigned by determining which addressable devices the WTRU is pointing at. For example, a user may point the WTRU at a television in order to control the television. Because the user is pointing the WTRU at the television, the television should be given priority over other electronic wireless devices. To assign priority, the location of each addressable device in relation to the WTRU may be determined. The direction in which the WTRU is pointing may also be determined. For each addressable device, the relation between the location of the addressable device and the direction in which the WTRU is pointing may be analyzed. When the analysis reveals that the WTRU is pointing at or near the location of an addressable device, that addressable device may be given a high priority value.

Priority values may also be assigned based on historical user selections. For example, a user sitting on a couch in front of a television often selects the television as the device she would like to control with the WTRU. The WTRU may keep a history of the selections made by the user. The WTRU may also record the location and time of the selection such that the WTRU may understand the context in which the selection was made. This usage context may later be used by the WTRU to predict the behavior of a user. For example, the WTRU may predict that whenever a user is within a living room and is sitting in front of a television, the user is likely to be interested in controlling the television. Accordingly, the WTRU may assign a high priority value to the television such that the television may be presented to a user before other addressable devices that the user may select.

Priority values may also be assigned according to a usage context. The usage context may be the circumstances that form the setting in which the WTRU and/or be addressable device may be used. For example, the usage context may be the time, place, and/or location that the WTRU and or the addressable device are used. Additionally, the usage context may be the relationship between the addressable devices and/or the WTRU. For example, a usage context may indicate that a DVD player and a television in a living room may be used together on a weekday afternoon.

In assigning values according to a usage context, a usage context may be determined by analyzing one or more of the following: the location of the WTRU, the location of the addressable devices, the time, the date, the place, the relationship between the addressable devices and/or the WTRU, the historical usage of the WTRU and/or the addressable devices, or the like. For example, it may be determined that the usage context is a user sitting in front of a television in a living room who wishes to control the television. Priority values may be then assigned to each addressable device according to that usage context.

When priority values are assigned to each of the addressable devices within the list of addressable devices, the list of addressable devices may then be provided to the user. Additionally the list of devices may also be ordered according to the priority value assigned to the addressable devices within the list, such that a device the user may most likely wish to control may be displayed before a device the user may be less likely to control. The user or WTRU may then select an addressable device from the list of addressable devices. For example, the WTRU may select the addressable device with the greatest priority value. If the WTRU selects the device, then the prioritized list may be stored in the WTRU but only the selected device is displayed to the user. In this case a means may be provided for the user to reject the selected device in which case another device in the list, if available, may be displayed to the user by the WTRU. When a selection is made, a connection between the WTRU and the addressable device may be established, such that the addressable device may be controlled by the WTRU.

FIG. 1A is a diagram of an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1A, the communications system 100 may include wireless transmit/receive units (WTRUs) 102a, 102b, 102c, 102d, a radio access network (RAN) 104, a core network 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a tablet, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106, the Internet 110, and/or the networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, i.e., one for each sector of the cell. In another embodiment, the base station 114a may employ multiple-input multiple output (MIMO) technology and, therefore, may utilize multiple transceivers for each sector of the cell.

The base stations 114a, 114b may communicate with one or more of the WTRUs 102a, 102b, 102c, 102d over an air interface 116, which may be any suitable wireless communication link (e.g., radio frequency (RF), microwave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A).

In other embodiments, the base station 114a and the WTRUs 102a, 102b, 102c may implement radio technologies such as IEEE 802.16 (i.e., Worldwide Interoperability for Microwave Access (WiMAX)), CDMA2000, CDMA2000 1X, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 1A, the base station 114b may have a direct connection to the Internet 110. Thus, the base station 114b may not be required to access the Internet 110 via the core network 106.

The RAN 104 may be in communication with the core network 106, which may be any type of network configured to provide voice, data, applications, and/or voice over internet protocol (VoIP) services to one or more of the WTRUs 102a, 102b, 102c, 102d. For example, the core network 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the core network 106 may be in direct or indirect communication with other RANs that employ the same RAT as the RAN 104 or a different RAT. For example, in addition to being connected to the RAN 104, which may be utilizing an E-UTRA radio technology, the core network 106 may also be in communication with another RAN (not shown) employing a GSM radio technology.

The core network 106 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 104 or a different RAT.

Some or all of the WTRUs 102a, 102b, 102c, 102d in the communications system 100 may include multi-mode capabilities, i.e., the WTRUs 102a, 102b, 102c, 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

Figure 1B:
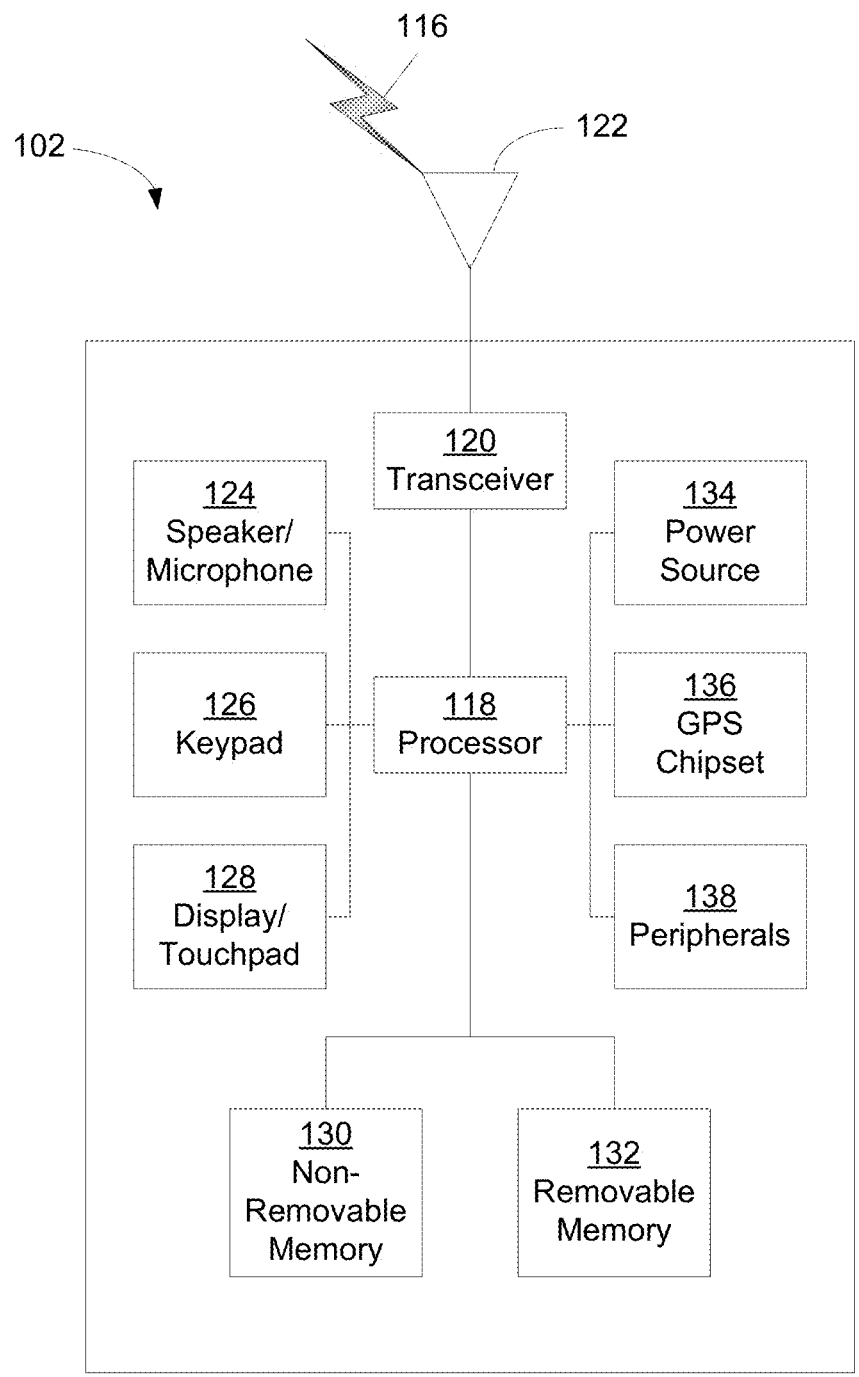
FIG. 1B is a system diagram of an example wireless transmit/receive unit (WTRU) that may be used within the communications system illustrated in FIG. 1A.

FIG. 1B is a system diagram of an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and other peripherals 138. It will be appreciated that the WTRU 102 may include any subcombination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 1C:
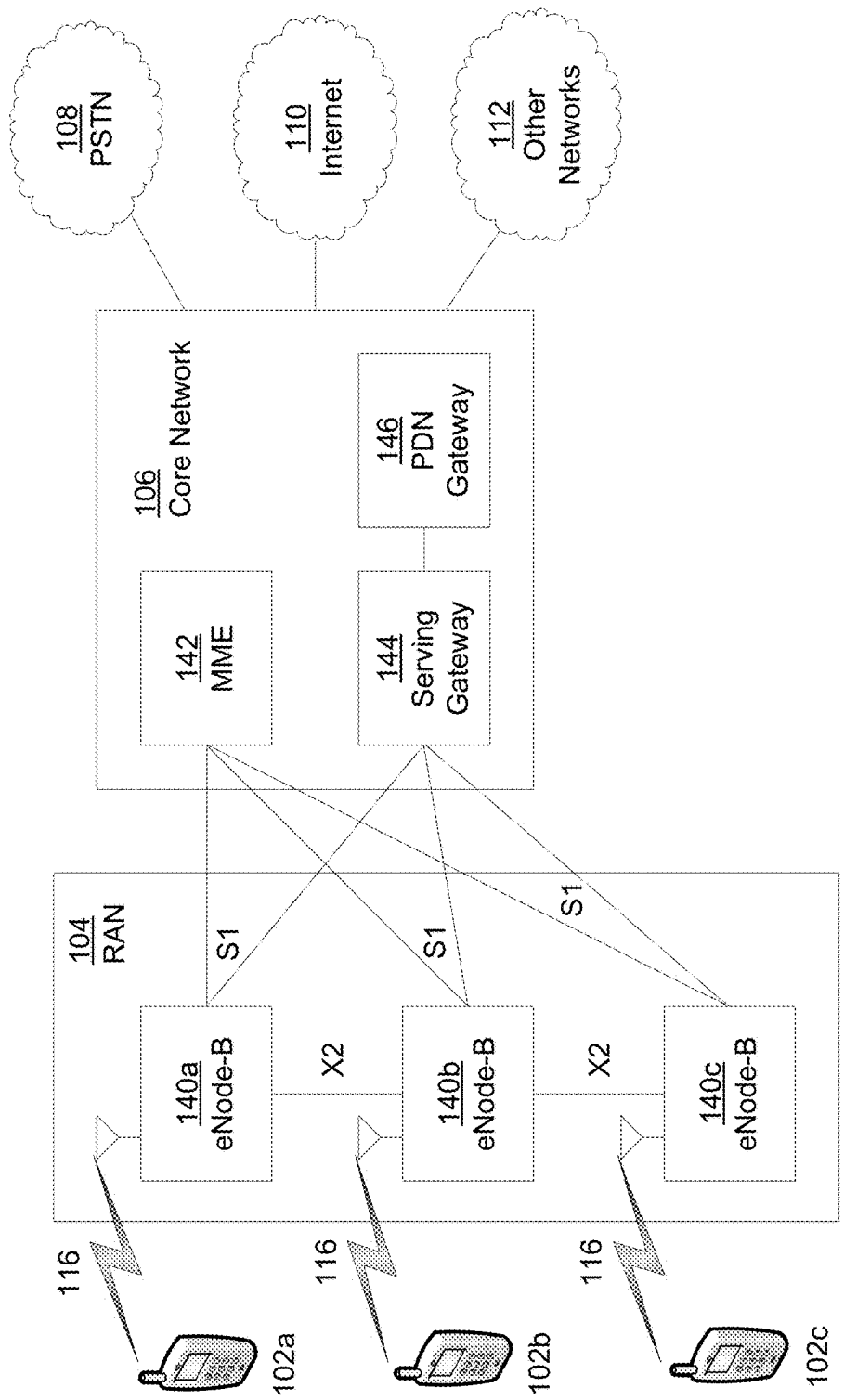
FIG. 1C is a system diagram of an example radio access network and an example core network that may be used within the communications system illustrated in FIG. 1A.

FIG. 1C is a system diagram of the RAN 104 and the core network 106 according to an embodiment. As noted above, the RAN 104 may employ an E-UTRA radio technology to communicate with the WTRUs 102a, 102b, 102c over the air interface 116. The RAN 104 may also be in communication with the core network 106.

The RAN 104 may include eNode-Bs 140a, 140b, 140c, though it will be appreciated that the RAN 104 may include any number of eNode-Bs while remaining consistent with an embodiment. The eNode-Bs 140a, 140b, 140c may each include one or more transceivers for communicating with the WTRUs 102a, 102b, 102c over the air interface 116. In one embodiment, the eNode-Bs 140a, 140b, 140c may implement MIMO technology. Thus, the eNode-B 140a, for example, may use multiple antennas to transmit wireless signals to, and receive wireless signals from, the WTRU 102a.

Each of the eNode-Bs 140a, 140b, 140c may be associated with a particular cell (not shown) and may be configured to handle radio resource management decisions, handover decisions, scheduling of users in the uplink and/or downlink, and the like. As shown in FIG. 1C, the eNode-Bs 140a, 140b, 140c may communicate with one another over an X2 interface.

The core network 106 shown in FIG. 1C may include a mobility management gateway (MME) 142, a serving gateway 144, and a packet data network (PDN) gateway 146. While each of the foregoing elements are depicted as part of the core network 106, it will be appreciated that any one of these elements may be owned and/or operated by an entity other than the core network operator.

The MME 142 may be connected to each of the eNode-Bs 142a, 142b, 142c in the RAN 104 via an S1 interface and may serve as a control node. For example, the MME 142 may be responsible for authenticating users of the WTRUs 102a, 102b, 102c, bearer activation/deactivation, selecting a particular serving gateway during an initial attach of the WTRUs 102a, 102b, 102c, and the like. The MME 142 may also provide a control plane function for switching between the RAN 104 and other RANs (not shown) that employ other radio technologies, such as GSM or WCDMA.

The serving gateway 144 may be connected to each of the eNode Bs 140a, 140b, 140c in the RAN 104 via the S1 interface. The serving gateway 144 may generally route and forward user data packets to/from the WTRUs 102a, 102b, 102c. The serving gateway 144 may also perform other functions, such as anchoring user planes during inter-eNode B handovers, triggering paging when downlink data is available for the WTRUs 102a, 102b, 102c, managing and storing contexts of the WTRUs 102a, 102b, 102c, and the like.

The serving gateway 144 may also be connected to the PDN gateway 146, which may provide the WTRUs 102a, 102b, 102c with access to packet-switched networks, such as the Internet 110, to facilitate communications between the WTRUs 102a, 102b, 102c and IP-enabled devices.

The core network 106 may facilitate communications with other networks. For example, the core network 106 may provide the WTRUs 102a, 102b, 102c with access to circuit-switched networks, such as the PSTN 108, to facilitate communications between the WTRUs 102a, 102b, 102c and traditional land-line communications devices. For example, the core network 106 may include, or may communicate with, an IP gateway (e.g., an IP multimedia subsystem (IMS) server) that serves as an interface between the core network 106 and the PSTN 108. In addition, the core network 106 may provide the WTRUs 102a, 102b, 102c with access to the networks 112, which may include other wired or wireless networks that are owned and/or operated by other service providers.

Figure 2:
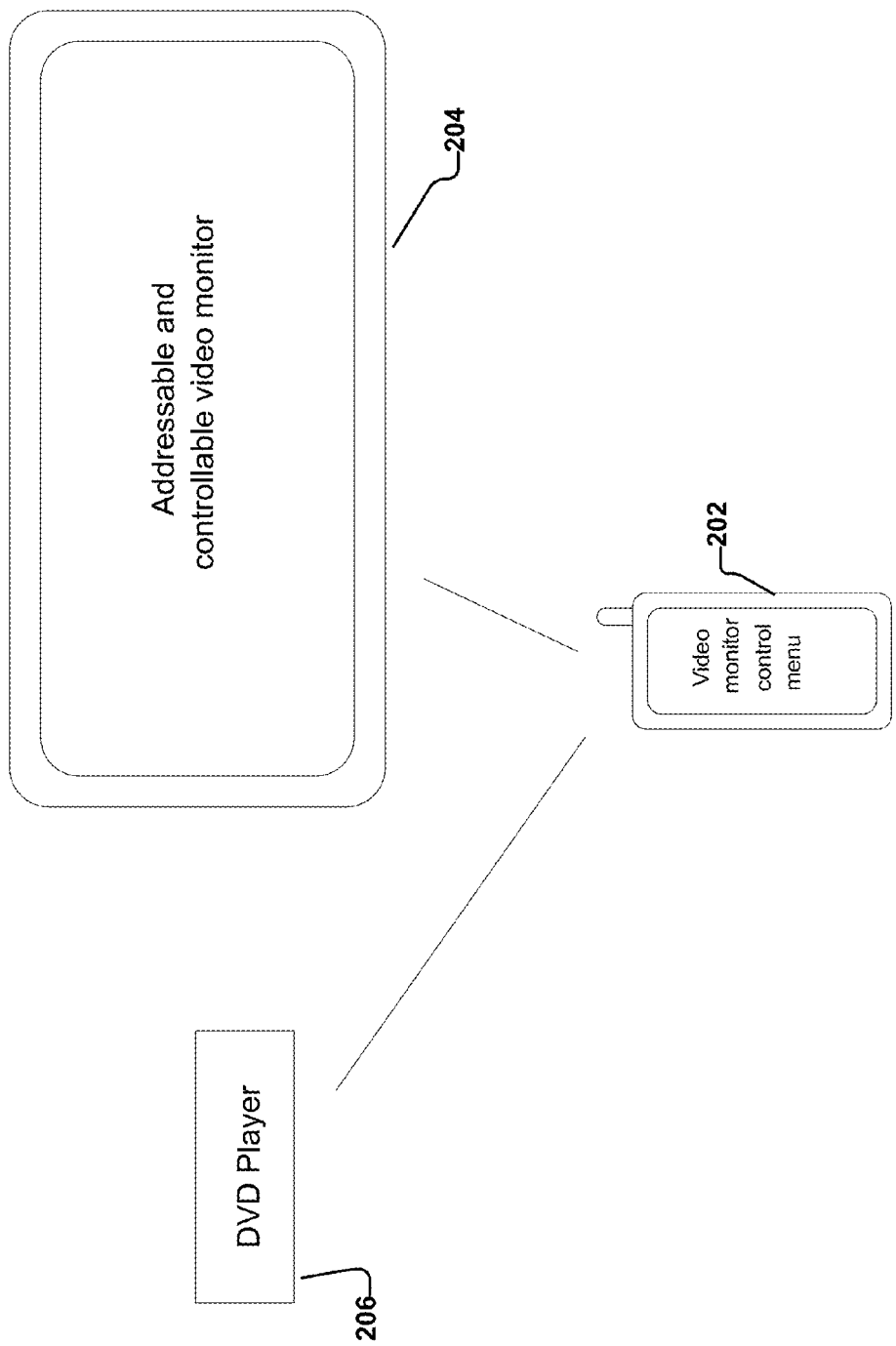
FIG. 2 is an illustration of a local interaction between a control device and a controllable device.

FIG. 2 is an illustration of local interaction using a WTRU, such as a SmartPhone, as the control device 202 with a plurality of controllable devices 204,206. For example, controllable device 304 may be a video display, or TV and controllable device 206 may be a DVD player. As shown in FIG. 2, control device 202 may be a SmartPhone that may be used to control the TV 204. To enable control device 202 to control the TV 204, control device 202 may analyze the DVD player 206 and TV 204 to determine whether those devices may be controlled. Additionally, control device 202 may analyze the selection and behavior of a user to determine which device (in this example, either the DVD player 206 or the TV 204) the user wishes to control.

Figure 3:
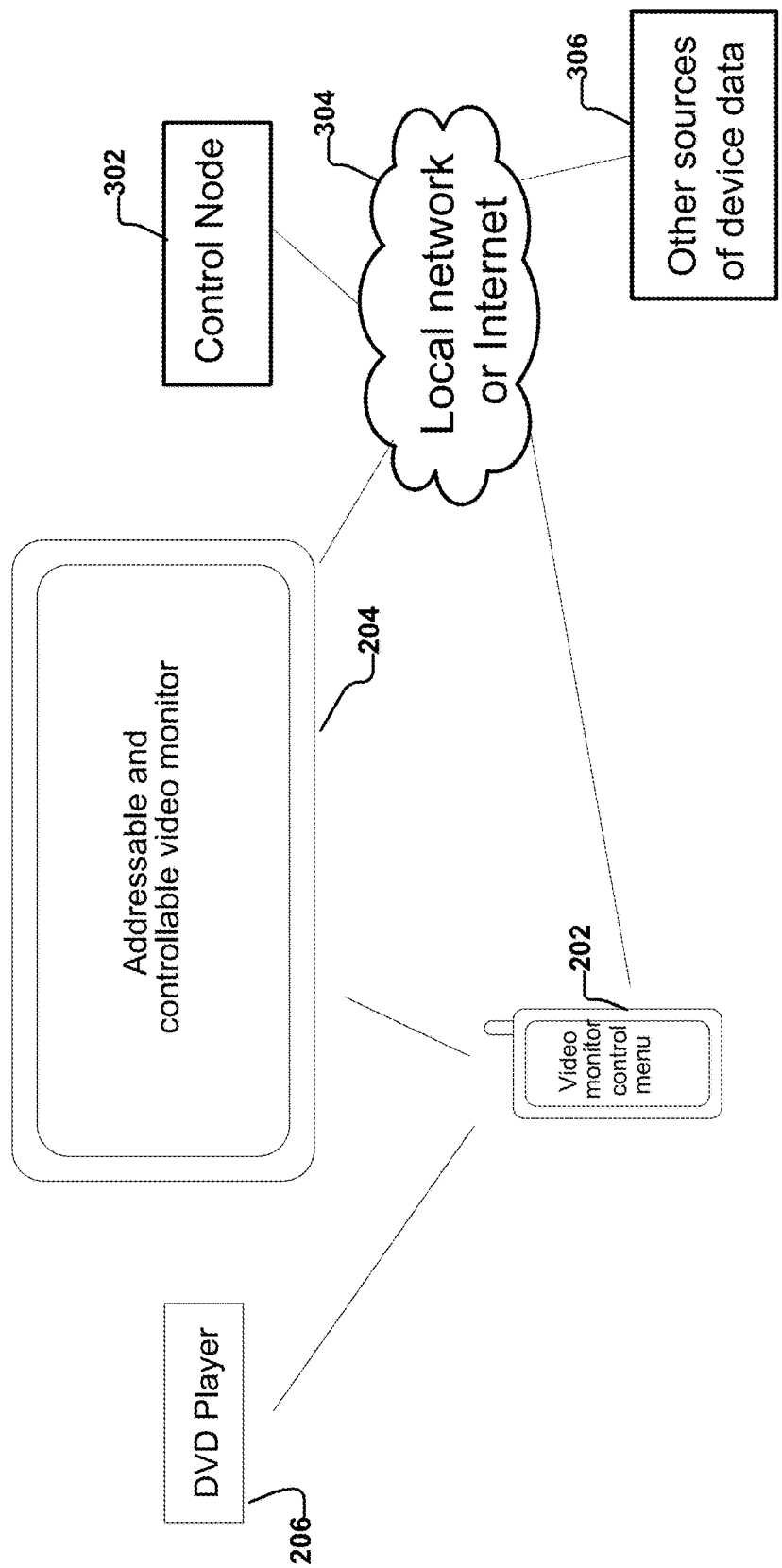
FIG. 3 depicts supplementing the system of FIG. 2 with a connection to a network and a control node connected to the network.

FIG. 3 depicts supplementing the system of FIG. 2 with a connection to a network 304 and a control node 302 connected to the network 304. The system may also use other network-based sources 306 that may be queried for information about the controlled or controlling device, such as controllable devices 204, 206 and control device 202. The network may be a local area network, e.g., located, owned or operated by the user, or the network may be a wide area network such that the devices may be connected to the Internet e.g., cloud-based network.

FIGS. 4A-C illustrate an example control device 202, controllable device 204, and control node 302, respectively, in more detail. For example, FIG. 4A depicts a control device 202, FIG. 4B depicts an addressable & controllable device 304, and FIG. 4C depicts a control node 302.

The control device 202 may be, for example, a WTRU, such as the WTRU described with respect to FIGS. 1A-C. Referring now to FIG. 4A-C, the control device 202 may have one or more air interfaces that enable it to search for, associate with, and exchange data with the devices to be controlled. Examples of air interfaces may include, but are not limited to, cellular, WiFi, Bluetooth, (infrared) IR, (radio frequency identification/near field communications) RFID/NFC, (visible light communications) VLC, Visual (e.g., camera, camcorder), audio (e.g., microphone, speaker), etc.

The addressable and controllable device 204 represents an example controllable device for which the user may want control. The controllable device 204 may have an air interface compatible to that of the control device, enabling communication between the control device 202 and the controllable device 204. The controllable device 204 may be a WTRU.

The controllable device 204 may have profile data that uniquely identifies the controllable device. For example, the profile data may include, but is not limited to, access technologies, a MAC address, IP address, or other ID, compressed photo or other image data, RFID tag, a type of device, etc. The profile data may be designed into the controllable device 204 at manufacture time, such as a MAC address, an IP address, or even a compressed photo that may be used to identify it via pattern matching. Alternatively the profile data may be loaded at installation time or during operation. For example, an IP address may be dynamically allocated or a network specific ID assigned. In addition, the profile data may directly identify the type of device, for example, a light switch, a thermostat, a TV, a dvd player, a refrigerator, AV units, video screens, garage doors, etc. The device may be identified using a set of categories common to all the system components. The profile data may also include information about permissions required for control, for example, the need for encryption keys or other credentials. The encryption keys or other credentials are datum that may be provided by a third party or another node, such as the control node 302.

The control node 302 may be incorporated into the system for providing a database of addressable and controllable devices. The database may include information about privileges or authorization needed to control a device, and encryptions keys or other required credentials. The control node 302 may query an external database such as via the internet, where the external database may be an internet or cloud-based server. The control node may also be part of a femtocell, access point, converged gateway, or a local server, etc that is accessible to, but physically separate from the hardware hosting the database. For example, as shown below in FIG. 8A, the control node may be software hosted and running in a converged gateway (CGW), and databases may be part of the CGW. Thus, the external database may be something outside of the device that hosts the control node or part of the device that holds the control node.

Referring now to FIGS. 4A-C, the external database may provide information to identify devices and load data. For example, similar to a computer download of drivers for a newly attached device, the control node may download data from the external database. The download capability may be implemented in the control node 302, a controlling device 202, or a controllable device 204. The control node 302 may include algorithms to validate and authenticate the controllable device(s) and/or control device(s). The validation and authentication functions may verify that the devices have not been tampered with, have no malware that may attempt rogue operations, identify authorized users, and identify whether a user is authorized to perform an attempted action.

As shown in FIG. 4C, the control node 302 may include databases, such as device database 402, that may contain information about the device IDs, and parameters that may be used to validate and authenticate the devices. As described above, the databases may be separate components, independently connected to a network.

In an embodiment, a user may point a control device 202 at a controllable device, such as controllable device 204, for which control may be desired, and the control device may detect the targeted controllable device. In another embodiment, the control device may detect a plurality of wireless nodes and list the available wireless nodes.

An example of an implementation is to point the mobile towards the desired device and have its name appear on the screen. Once the user targets the appropriate device, the mobile terminal may then specify what actions may be done by, for example, displaying a device-specific menu or touch-screen capable control screen. For example, the user may point at the refrigerator. The list displayed might include "read internal temperature," "set internal temperature," "get days left on water filter," etc. The mobile device may have an icon, such as a refrigerator icon, and the selections may be available using a right click, touch screen interface, soft key, keypad selection, or similar mechanism.

The use of the control device as disclosed herein may replace or supplement the use of remote controls in the home and communicate with any number of smart devices in the home. Use cases may be as simple as turning things such as lights on or off. The control device may also function to collect status information from devices, for example, a light reporting remaining expected life. Many other use cases may be envisioned for the pointing approach, such as: kiosks, information on products, interfaces for vending machine, smart signs, etc.

A simple prototype to demonstrate the pointing concept may be implemented as follows:
1) Use a directional antenna in a control device, such as a SmartPhone or other mobile terminal. The prototype may use Bluetooth and, for example, a 'cantenna' (antenna in a can) to make the propagation directional, for example.
2) Perform an inquiry that returns an received signal strength indicator (RSSI) measurement.
3) Select the device with the greatest RSSI.

Figure 5:
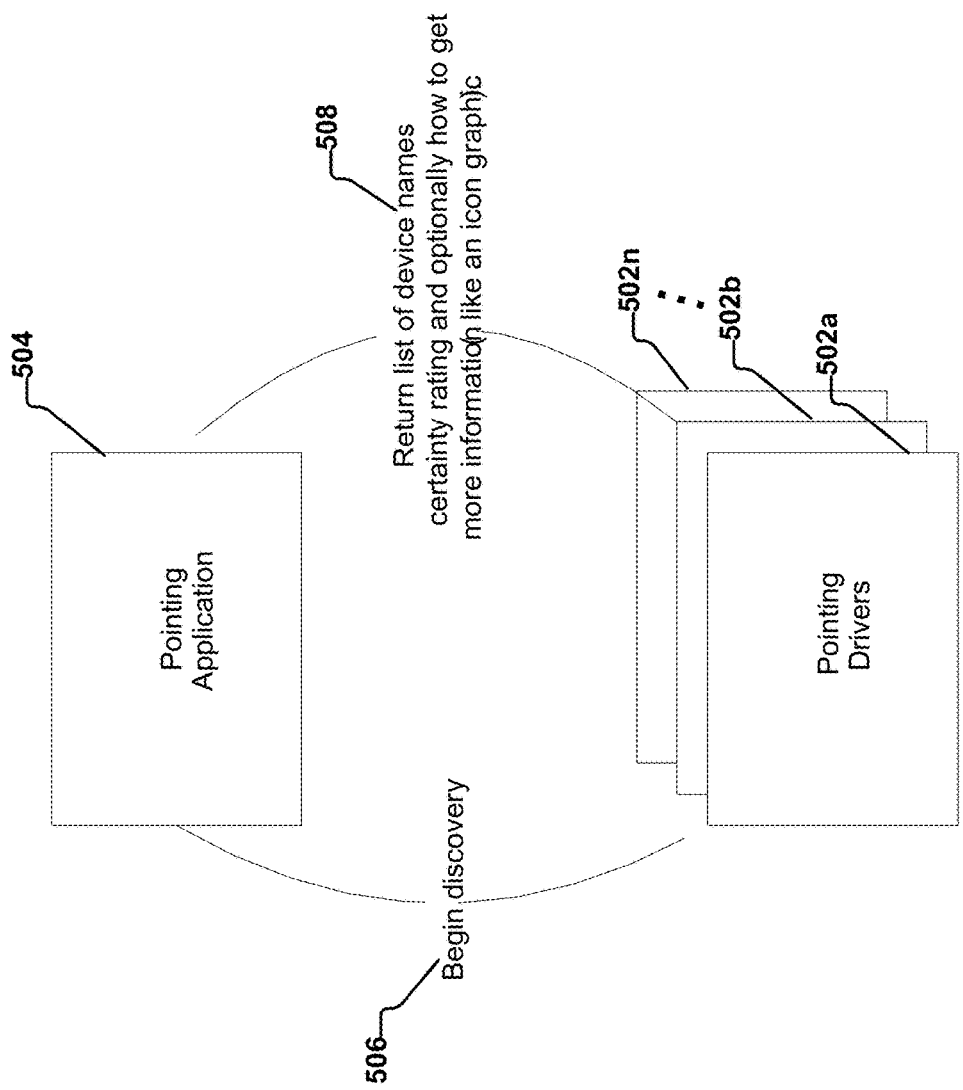
FIG. 5 depicts a high-level diagram of how the pointing interaction may be implemented.

FIG. 5 depicts a high-level diagram of how the pointing interaction may be implemented. For example, implementation of the pointing interaction may be initiated when a user activates a directional discovery process application 504. In turn, the application 504 may begin discovery at 506, starting available drivers 502 that support the mode of discovery. The drivers may report back, at 508, the results in ranked lists, and the application may present the user with the top ranking device. For example, the application 504 may display a name or a name with an icon. The icon may be retrieved from the device itself, cached in the UE, retrieved from a controlled device, retrieved from the control node, or retrieved from the Internet. The user may look at other possible devices returned in the list, if the top ranking one is not correct. The user may then select the desired device. The driver 502 that reported the selected device may then be queried on how to interact and control the device.

The pointing and control functions may be performed by the same driver or protocol or they may be performed by a different driver or protocol. For example, the pointing may be the discovery method that results in the identification of the device to the user and how to control the device thereafter. However, the control may be performed by a different set of protocols and/or drivers Protocols for pointing discovery may be implemented in a single driver or a plurality of drivers. For example, as shown in FIG. 5, possible protocols for pointing discovery may each be implemented as a driver 502. Possible protocols for pointing discovery may include, but are not limited to, any one or combination of the following:

Use a directional antenna and RSSI to find devices being pointed at (as described in the example above using, for example, Bluetooth). The directional antenna may have a fixed pattern, or may use means of adaptive beam forming to maximized received signal power in one direction or minimize interference in other directions.

Use a function of distance from transmitter, transmit power, and received power to determine if a device is pointing at another. Distance may be determined by doing a timing calculation or by another distance sensor (like one used for the camera focus perhaps). The transmit power measurement would be transmitted by the transmitter. Distance may not be necessary in confined areas such as a room.

If no directional antenna is available, RSSI could still be used to make a best attempt at detecting devices nearby.

Using the location of both transmit and receive devices relative to each other and a directional vector (compass) from the receive devices. The location of transmit devices would have to be stored in a database. This could be done in 2 dimensional space (suitable for indoors) or 3 dimension space (outdoors).

Image recognition could be used to detect devices pointed to by the camera. Tags could be used or the device could be trained to recognize images.

The location of the WTRU may be recorded at two points in time to determine a vector. Assuming that the device locations are known, the vector may be used to find any devices that the vector may be pointing to. For example, devices in line with those points that are in the same direction as the vector may be found.

VLC (Visible Light Communications)

NFC (Near Field Communications)

IR (Infrared.)

The addressing and control of devices may be a local function such that the addressing and control is based on the interaction between the controlling and controlled devices. For example, the addressing and control functions may result from the interaction of the control and controllable devices without a need for communication outside of the communication between devices. The control device(s) and/or controllable device(s) may be connected to a network that participates in the activity by providing a means to supplement data that is available, identify devices, validate devices, or authorize the control or interaction.

The addressing/selection aspect, using the pointing methods described herein, for example, may function in combination with service discovery methods or may function separately. For example, service discovery protocols allow automatic detection of devices on a computer network. The point and select technique, however, enables a user to point a control device at a targeted controllable device and, via the connection established between the wireless node and the control device, assume control of the controllable device. While functioning via a computer network may supplement the point and select techniques disclosed herein, a network is not necessary for the control device to address, control, or monitor a wireless node. Further, the addressing/selection techniques may work differently in different contexts (e.g., inside with short distances vs. outside long distances) but the user experience may remain the same, for example, point and select. Thus, in some ways, the control device may function similar to a remote control. However, the control device may detect the controllable device without a need for pre-programming or manually programming functional codes into the control device for each unique controllable device, as required for many remote controls. Further, the control device may function for any number of wireless nodes, providing a user with a user interface that facilitates selection of the device for which control is desired.

An exemplary protocol may identify an object (e.g., controllable device) by a name and/or an icon as part of an inquiry. If an object is selected a query may return, for example, an html web page for display. The displayed web page may include links to other web pages allowing for actions to be triggered. Other methods could be used to keep the logic simple, for example, a single touch screen menu display with a list of options, series of icons, or graphic that resembles a remote control.

Figure 6:
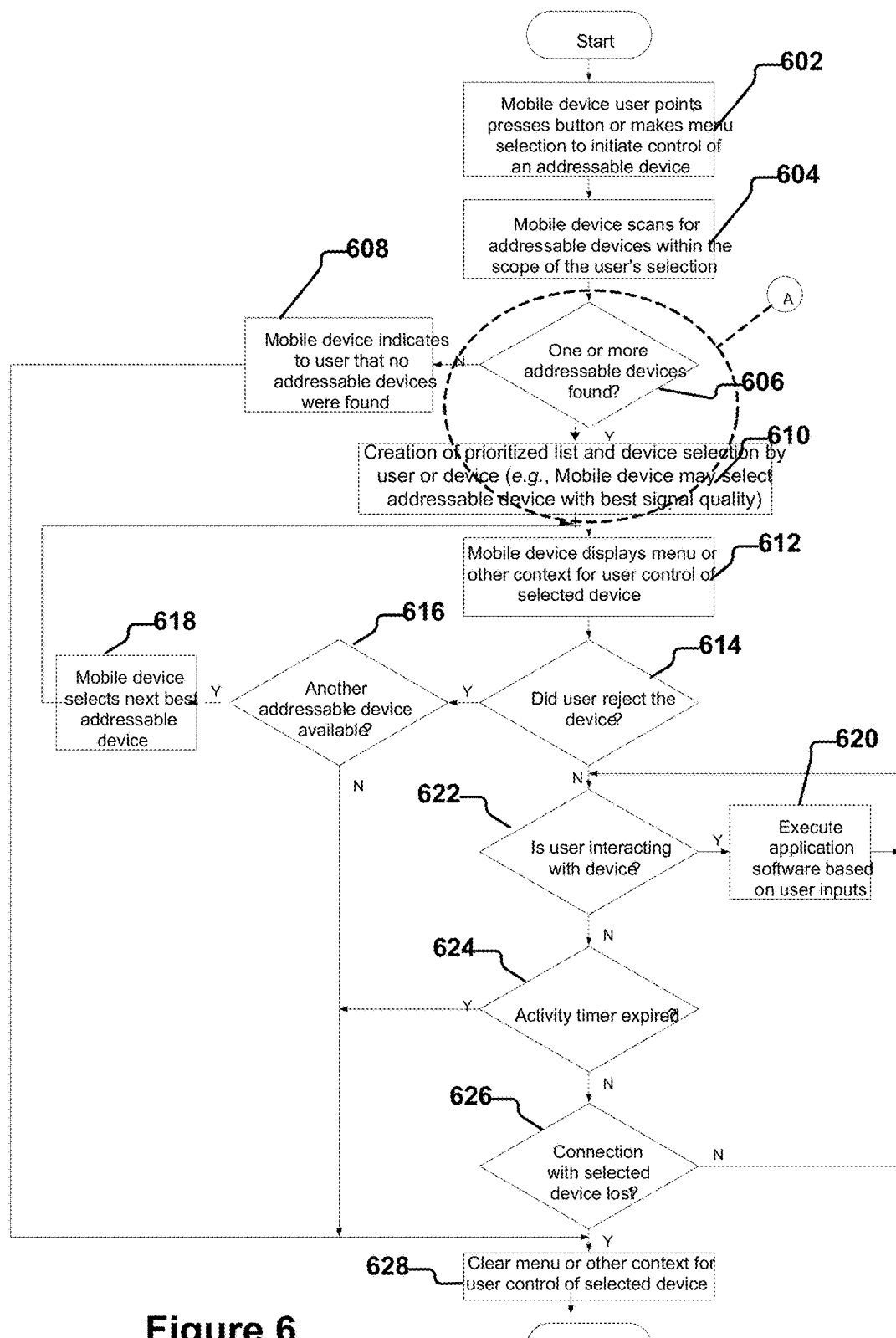
FIG. 6 illustrates an example method for implementing a pointing interaction.

FIG. 6 illustrates an example method for implementing a pointing interaction that elaborates on the implementation described and shown in FIG. 5. For example, FIG. 6 may apply to the prioritization of devices based on methods that use the pointing method disclosed herein or that use other methods for ranking devices.

The process may begin at 602 with the user attempting to initiate control of a device by, for example, pointing, pressing a button, making a menu selection, or executing any other technique for selecting a device for control. At 604, the user's mobile device may scan for addressable and controllable devices in the area using an air interface, such as one of the example air interfaces described previously. As part of this process the mobile device may accept devices it may address and control and bypass (or reject) others. The decision to accept or reject a device may be made by analyzing profile data received from the located device. For example, a device may require encryption keys or other credentials. Credentials may carry over from previous control sessions with the device and some interaction between the mobile terminal and device may be required to check or exchange credentials. (If applicable, a Control Node may be involved in this process.)

If one or more addressable devices are found at 606 as a result of the scan, the mobile terminal may select a device to be controlled which may involve the creation of a prioritized list at 610 (unless no devices were found, or only one device was found). At 612, the control device may display a menu or other context for user control of the selected device. At 610, the mobile device may make a device selection based on the priority or the user may select the device for which control is desired. For example, the control device may display a menu having a selectable list, where the user may select the desired device for which to control. More sophisticated methods may be implemented, such as voice input with speech recognition. Alternatively a map, image, photo, or other rendering of the local environment may be displayed with icons, coloring, blinking, numbering, or other method to highlight the controllable devices that the user may select by keypad or touch screen input. A virtual reality approach may be used, for example, where the highlighting is activated only when the controlling device is pointed at one of the controllable device or a user input via, for example, a touch screen indicates the general area of the controllable device. If a 2D rendering is used, a 2D touch screen swipe may be used to make a selection. If a 3D rendering is used, a 3D motion of the terminal may be used to make a selection detected with accelerometers typically used in mobile devices and video game controllers.

If no devices are found, at 608 the mobile device may indicate to the user that no addressable devices were found.

The prioritized, or ranking, list, may be based on signal quality, for example, SNR or RSSI, as described as an example at 610. However, the ranking in the prioritization list may be based on other factors or combination of factors. For example, if location information is available or distance information is available (either a priori or based on the scanning), then proximity or direction may be used as part of the prioritization. If the user's menu selection involved selecting a type of device (e.g., the user pressed a menu icon of a TV), then the prioritization algorithm may include the user's device preference giving the closest matches the highest priority. Matching the device preference may be based on profile data such as data fields that identify the type of device. Matching devices may be based on visual info, image matching, or pattern matching for example if the mobile terminal "takes a picture" in the general direction of a controllable device, a pattern match may be used to help identify and select it. The mobile device may create a database of Controllable Devices that were previously used by the user. Previous use may be a parameter used in the current prioritization.

Recognizing that the mobile terminal's top selection in the prioritized list may not match the user's desire, the process allows the user to reject the selection at 614. This may be as simple as including a reject option as part of the interaction offered to the user, for example, a menu selection or even action such as shaking or flicking the mobile terminal. If a device is rejected, and another addressable device is available at 616, the mobile terminal may step through the list at 618 until one is accepted or the full list has been offered.

If the user is actively interacting with the control capability provided by the mobile device at 622, then at 620 the mobile device may execute whatever applications and communication protocols that enable control of the controllable device. Note that the air interface used to scan for, associate, and identify the device need not be the same air interface used during the interaction. For example, suppose the Controlled Device is identified by the combination of the mobile terminal taking a picture and a Bluetooth association. Subsequently, the control may use, for example, Wi-Fi.

The context may remain active as long as the user is interacting with the controllable device and even for some time thereafter. Examples of closing out a context are at 624 and 626. For example, at 624, an activity timer may be running and the context may expire when the timer expires. At 626, a connection with the selected controllable device may be lost, thus causing the context to also expire. For example, the air interface connection with the controlled device may be broken and remain broken for a predetermined time, either running out an activity timer at 624 or indicating a lost connection at 626. At some point, such as a result of the examples at 624 and 626, the full context or menu may be cleared (or "minimized") at 628 and eventually all related processes terminated.

Figure 7:
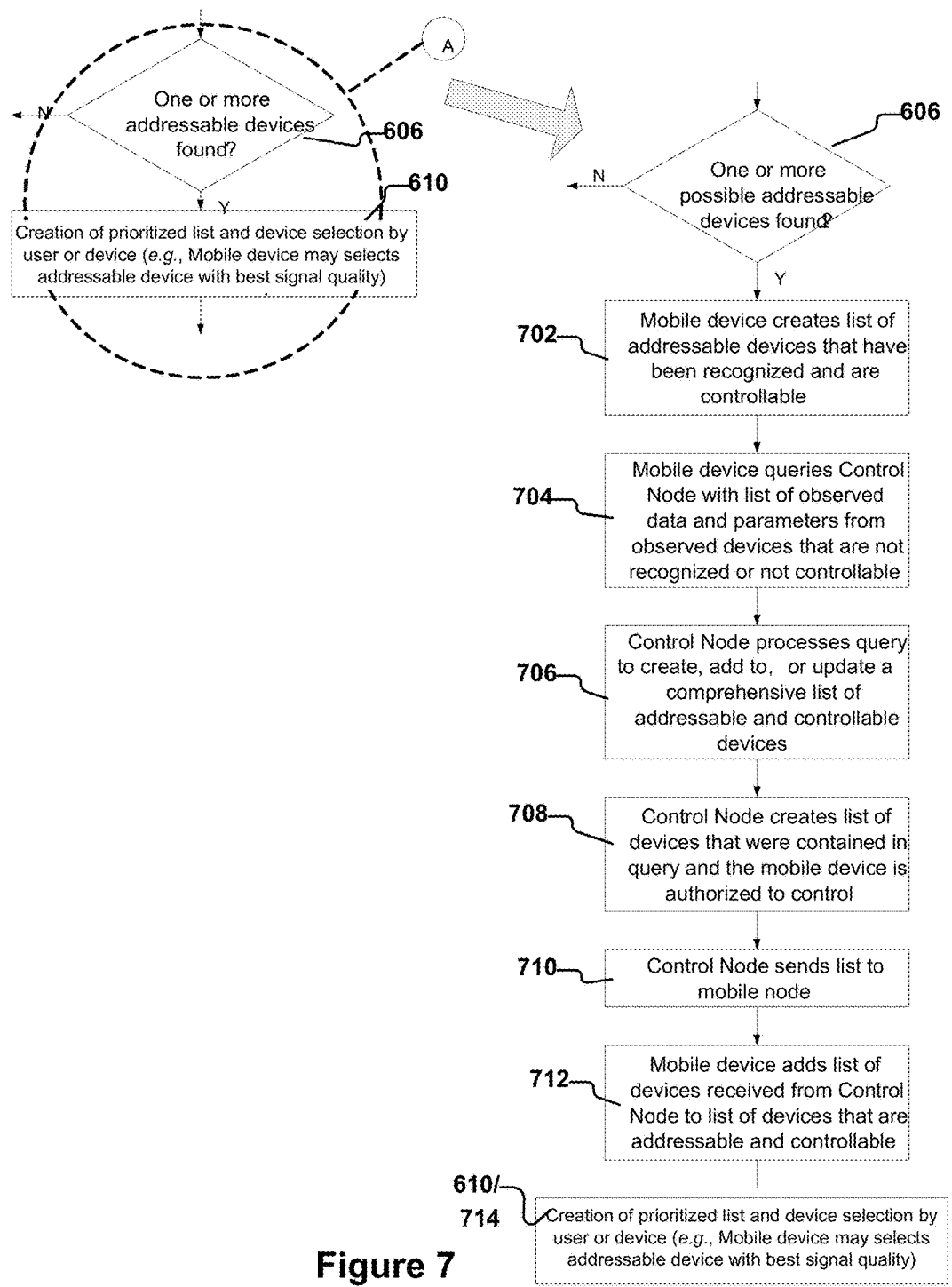
FIG. 7 illustrates an example method for implementing a pointing interaction incorporating a network and control node

FIG. 7 extends the process from FIG. 6 to a scenario where there is a network and control node as described with respect to FIG. 3 and FIG. 4C. Note that the flowchart in 6 may replace the portion of the flowchart in FIG. 6 labeled "A." In the example shown in FIG. 7, the mobile device may communicate and perhaps associate with multiple devices but may not have the ability to identify and control all of them. In this example, a control node may provide this ability. Thus, at 606, the determination may be whether one or more possible addressable devices are found. As described in FIG. 6, the mobile device may select the device for control at 610. Or, for example, as shown in at 702 in FIG. 7, the mobile device may create a list if addressable devices are recognized and are controllable. At 704, the mobile device may send the control node a query with information about devices that were detected but not recognized or not controllable. The control node may process the query at 706, and use the information from the mobile device to update its own comprehensive data base of devices.

As part of the protocol, the mobile device may send location information to the control node, or the control node may have access to the mobile device's location via some other means. In such a case, the control node may use this location information as part of its own database of devices.

From the list of devices sent by the mobile terminal, at 708 the control node may select from those devices and list the devices the mobile terminal is authorized to control. At 710, the control node may send that list to the mobile terminal along with any other parameters required to enable control. The control node may also check mobile terminal credentials and send encryption keys or other credentials that the mobile terminal will need to initiate control of a controllable device. The encryption keys or other credentials may have expiration times. Subject to the expiration times, the mobile device may have the option to initiate control of the Controllable Device in the future without involving the Control Node.

At 712, the mobile terminal may now add the devices from the list provided by the control node to the initial list of devices. Thus, at 714, the mobile device may select the addressable and controllable device at 714 and then continue with the processing at 610 shown in FIG. 6.

It is noted that if the mobile terminal discovers some devices that do not need interaction with the control node, then it may continue the process of FIG. 6 and execute the interaction without the control node or execute with the control node in parallel. Thus, if the user selects one of the offered devices, then a potential delay involved with the control node interaction may be eliminated. Even if the user picks one of the offered devices, the interaction with the control node may be desired to populate the mobile terminal's database of devices to expedite future interactions.

Figure 8A:
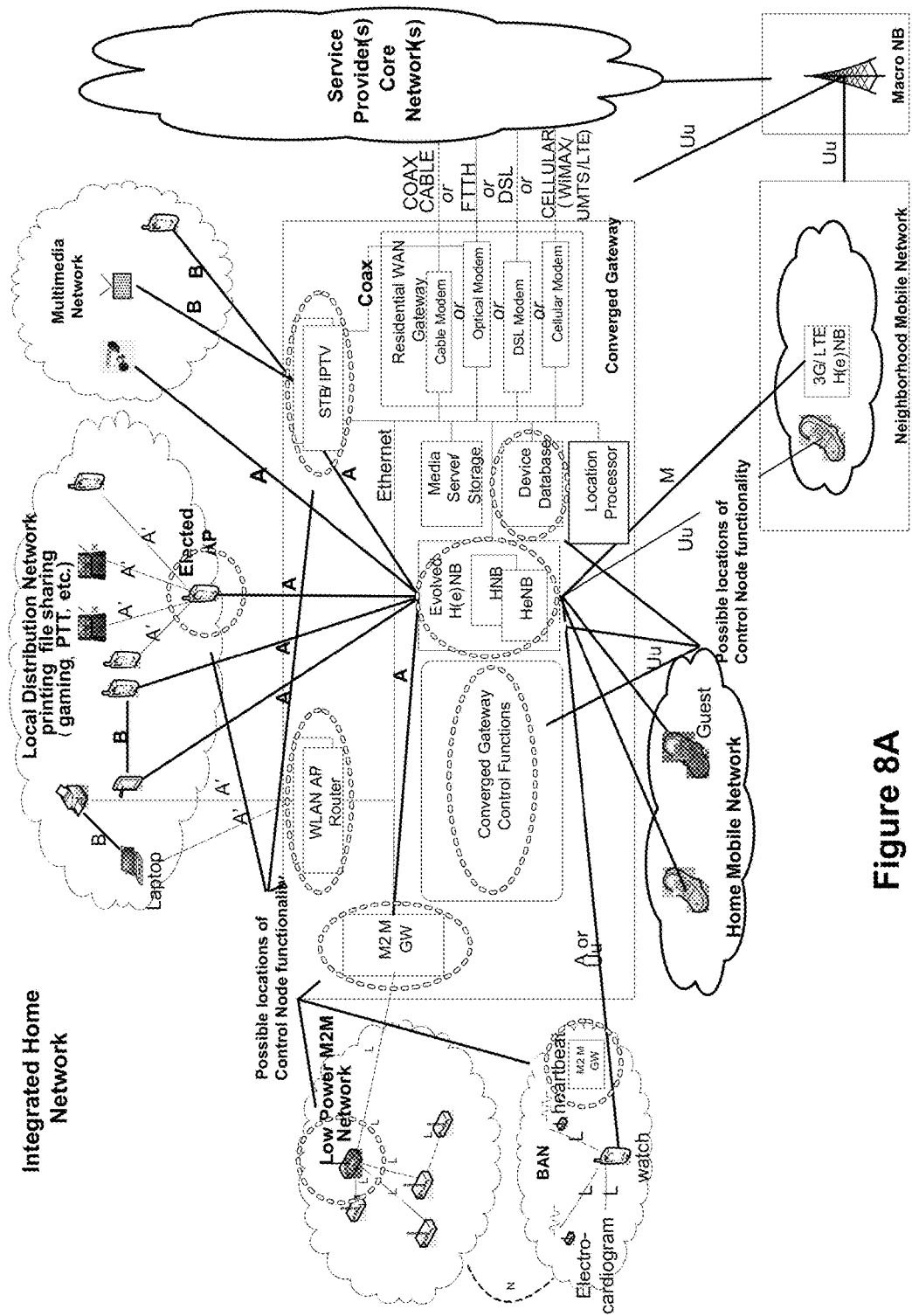
FIG. 8A depicts an example control node that interacts via a converged gateway, including possible locations of control node functionality.
Figure 8B:
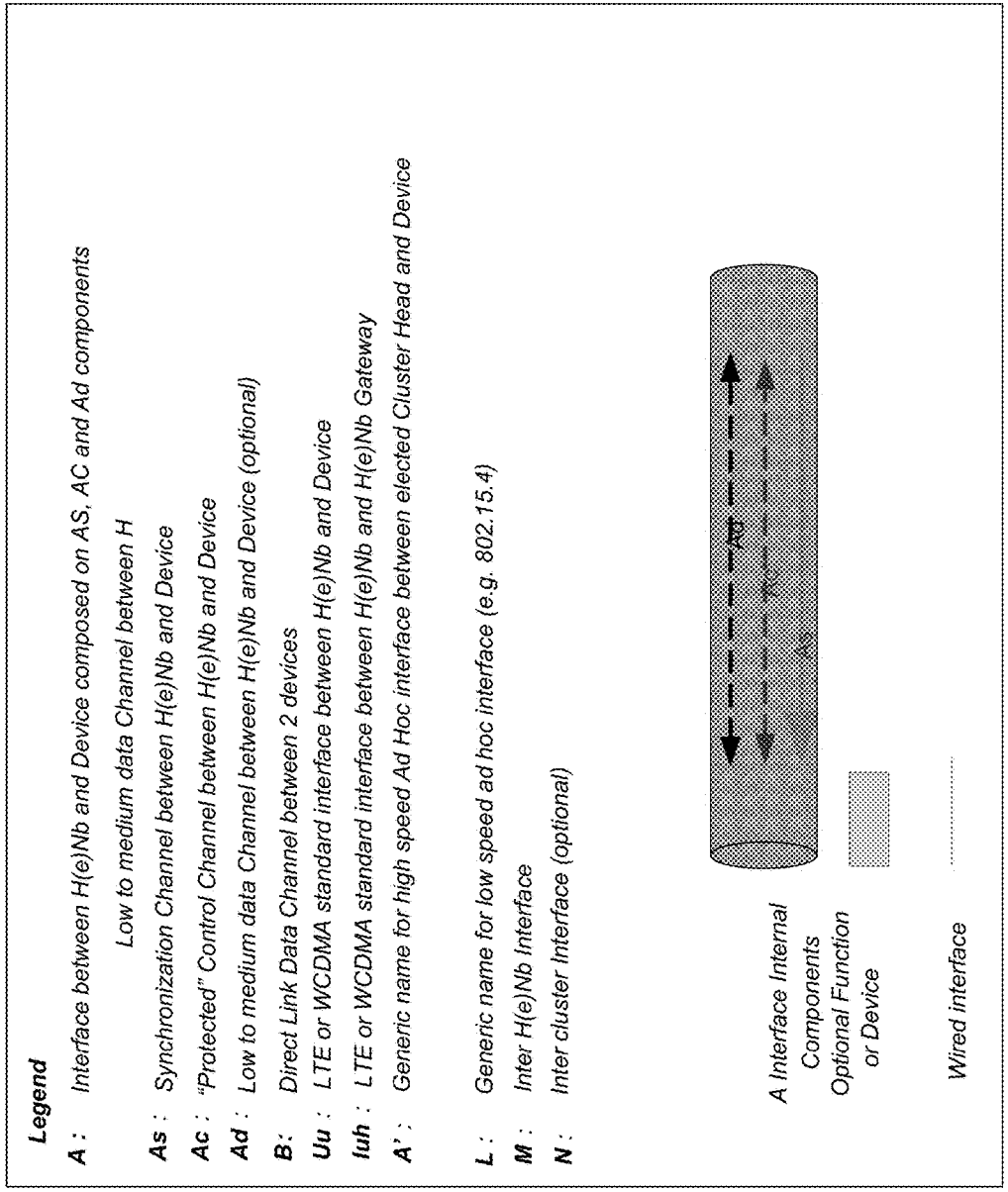
FIG. 8B depicts a legend that corresponds to FIG. 8A.

As described above, the control node 302 may be incorporated into the system for providing a database of addressable and controllable devices. FIG. 8A provides more detail of an example control node that may function as part of a converged gateway, including possible locations of control node functionality. In particular, functions of the control node may be distributed among various software or hardware blocks in the converged gateway. Examples of this are illustrated in FIG. 8A. FIG. 8B depicts a legend that corresponds to FIG. 8A. FIG. 8A shows a block diagram of the converged gateway (CGW) architecture, however, any particular implementation may include a subset of the functions shown. For example, the CGW may reduce to a WLAN Access Point, Femto-cell, Home Node B (HNB) or Home enhanced Node B (HeNB). The Control Node functionality may be integrated into, or distributed among, some of the CGW functions. Examples of CGW functions that may include Control Node functions are identified in the figure.

Though the example embodiments described herein are carried out in the context of the transmitters/receivers described, it is to be understood that the technique applies to systems with any number of transmitters or receivers that are compatible with the air interface technology or technologies employed. While the various embodiments have been described in connection with the various figures, it is to be understood that other similar embodiments may be used or modifications and additions may be made to the described embodiment for performing the same function of the various embodiments without deviating there from. Therefore, the embodiments should not be limited to any single embodiment, but rather should be construed in breadth and scope in accordance with the appended claims.

Although features and elements are described above in particular combinations, one of ordinary skill in the art will appreciate that each feature or element may be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed:

1. A method for selecting a controllable device to be controlled by a wireless transmit/receive unit (WTRU), the method comprising:
   determining, by the WTRU, a usage context;
   generating, by the WTRU, a list of one or more devices based on the usage context;
   determining, by the WTRU, a controllable device that is able to be instructed to perform an action on behalf of the WTRU by analyzing a relationship between a first device and a second device from the list of one or more devices; and
   determining, by the WTRU, a priority value for the controllable device using the one or more devices.

2. The method of claim 1, wherein the usage context is determined based on at least one of a historical user selection, a usage relationship between the WTRU and the one or more devices, a location of the WTRU, a date, or a time.

3. The method of claim 1, further comprising sorting the list using the priority value.

4. The method of claim 3, further comprising displaying the sorted list.

5. The method of claim 1, wherein determining the priority value for the controllable device using the one or more devices comprises using a proximity of the one or more devices to the WTRU, a direction the WTRU is pointing, a signal quality, or the usage context.

6. The method of claim 1, further comprising establishing a connection between the WTRU and the controllable device.

7. A wireless transmit/receive unit (WTRU) to select and control a controllable device, comprising:
   a memory; and
   a processor configured at least in part to:
      determine a usage context;
      generate a list of one or more devices based on the usage context;
      determine a controllable device that is able to be instructed to perform an action on behalf of the WTRU by analyzing a relationship between a first device and a second device from the list of one or more devices; and
      determine a priority value for the controllable device using the one or more devices.

8. The WTRU of claim 7, wherein the usage context is determined based on at least one of a historical user selection, a usage relationship between the WTRU and the one or more devices, a location of the WTRU, a date, or a time.

9. The WTRU of claim 7, wherein the processor is further configured to sort the list using the priority value.

10. The WTRU of claim 9, wherein the processor is further configured to display the sorted list.

11. The WTRU of claim 7, wherein the processor is configured to determine the priority value for the controllable device by using a proximity of the one or more devices to the WTRU, a direction the WTRU is pointing, a signal quality, or the usage context.

12. The WTRU of claim 7, wherein the processor is further configured to establish a connection between the WTRU and the controllable device.

13. A method for selecting a device to be controlled by a wireless transmit/receive unit (WTRU), the method comprising:
   determining, by the WTRU, a controllable device that is able to be instructed to perform an action on behalf of the WTRU by analyzing a relationship between a first device and a second device from a list of devices;
   determining, by the WTRU, a usage context associated with the controllable device;
   displaying, by the WTRU, a device identifier for the controllable device in response to the usage context; and
   assigning, by the WTRU, a priority value to the controllable device.

14. The method of claim 13, wherein the usage context is determined using at least one of a historical user selection, a usage relationship between the WTRU and the device, a location of the WTRU, a date, or a time.

15. The method of claim 13, further comprising displaying the priority value.

16. The method of claim 13, wherein the priority value is assigned to the controllable device is based on at least one of a proximity of the device to the WTRU, a direction the WTRU is pointing, a signal quality, or the usage context.

17. The method of claim 13, further comprising establishing a connection between the WTRU and the controllable device.

18. A wireless transmit/receive unit (WTRU) to select and control a device comprising:
   a processor configured to:
      determine a controllable device that is able to be instructed to perform an action on behalf of the WTRU by analyzing a relationship between a first device and a second device from a list of devices;
      determine a usage context associated with the controllable device;
      display a device identifier for the controllable device in response to the usage context; and
      assign a priority value to the controllable device.

19. The WTRU of claim 18, wherein the processor is configured to determine the usage context using at least one of a historical user selection, a usage relationship between the WTRU and the device, a location of the WTRU, a date, or a time.

20. The WTRU of claim 18, wherein the processor is further configured to display the priority value.

21. The WTRU of claim 18, wherein the processor is configured to assign the priority value to the controllable device based on at least one of a proximity of the device to the WTRU, a direction the WTRU is pointing, a signal quality, or the usage context.

22. The WTRU of claim 18, wherein the processor is further configured to establish a connection between the WTRU and the controllable device.

* * * * *